United States Patent
Okino

(10) Patent No.: US 11,983,177 B2
(45) Date of Patent: May 14, 2024

(54) INFORMATION PROCESSING DEVICE AND FILE ACCESS METHOD

(71) Applicant: Sony Interactive Entertainment Inc., Tokyo (JP)

(72) Inventor: Naoto Okino, Tokyo (JP)

(73) Assignee: Sony Interactive Entertainment Inc., Tokyo (JP)

( * ) Notice: Subject to any disclaimer, the term of this patent is extended or adjusted under 35 U.S.C. 154(b) by 42 days.

(21) Appl. No.: 17/783,329

(22) PCT Filed: Sep. 28, 2020

(86) PCT No.: PCT/JP2020/036717
§ 371 (c)(1),
(2) Date: Jun. 8, 2022

(87) PCT Pub. No.: WO2021/124634
PCT Pub. Date: Jun. 24, 2021

(65) Prior Publication Data
US 2022/0414096 A1 Dec. 29, 2022

(30) Foreign Application Priority Data
Dec. 16, 2019 (JP) .................. 2019-226718

(51) Int. Cl.
*G06F 16/00* (2019.01)
*G06F 16/22* (2019.01)
(Continued)

(52) U.S. Cl.
CPC .... *G06F 16/24524* (2019.01); *G06F 16/2255* (2019.01); *G06F 16/244* (2019.01)

(58) Field of Classification Search
CPC ........... G06F 16/24524; G06F 16/2255; G06F 16/244; G06F 16/137; G06F 16/152; G06F 9/445; G06F 13/00
See application file for complete search history.

(56) References Cited

U.S. PATENT DOCUMENTS

| 7,587,433 B2 | 9/2009 | Peleg |
| 7,751,628 B1 | 7/2010 | Reisman |
| (Continued) | | |

FOREIGN PATENT DOCUMENTS

| CN | 103440204 A | 12/2013 |
| JP | 04260945 A | 9/1992 |
| (Continued) | | |

OTHER PUBLICATIONS

Jett, Jacob, et al., "A Conceptual Model for Video Games and Interactive Media", Journal of the Association for Information Science and Technology, vol. 67, No. 3, pp. 505-517, May 18, 2015.
(Continued)

*Primary Examiner* — Jared M Bibbee
(74) *Attorney, Agent, or Firm* — Matthew B. Dernier, Esq.

(57) ABSTRACT

An attribute information setting section loads information indicating whether or not access to each of a plurality of files is allowed, into a memory. A readout request receiving section receives a readout request including a file path from a program. A hash value deriving section derives a hash value of a file path included in the readout request. A file confirming section confirms whether or not the derived hash value matches with one of hash values of the files included in software. A determining section refers to the information loaded into the memory by the attribute information setting section in a case in which matching of the hash values is confirmed, to thereby determine whether or not a process on the file which has been subjected to the readout request is executable.

8 Claims, 5 Drawing Sheets

(51) Int. Cl.
*G06F 16/242* (2019.01)
*G06F 16/2452* (2019.01)

(56) References Cited

U.S. PATENT DOCUMENTS

| | | | |
|---|---|---|---|
| 8,238,203 | B2 | 8/2012 | Morohoshi |
| 9,286,059 | B2 | 3/2016 | Hatakeyama |
| 9,529,725 | B2 | 12/2016 | Hashimoto |
| 9,678,966 | B2 | 6/2017 | Ki |
| 9,830,345 | B1 | 11/2017 | Baars |
| 10,114,829 | B1 | 10/2018 | Bono |
| 10,146,466 | B1 | 12/2018 | Puhov |
| 10,372,336 | B2 | 8/2019 | Xu |
| 10,482,065 | B1 | 11/2019 | Armangau |
| 10,891,389 | B2 | 1/2021 | Takumi |
| 11,093,452 | B2 | 8/2021 | Lection |
| 2005/0065961 | A1 | 3/2005 | Aguren |
| 2006/0004756 | A1 | 1/2006 | Peleg |
| 2008/0082590 | A1 | 4/2008 | Hamilton |
| 2009/0067819 | A1 | 3/2009 | Tanaka |
| 2011/0245947 | A1 | 10/2011 | Morohoshi |
| 2012/0257872 | A1 | 10/2012 | Toyoda |
| 2014/0201209 | A1 | 7/2014 | Hashimoto |
| 2015/0126283 | A1* | 5/2015 | Okino .................. A63F 13/71 463/42 |
| 2015/0126284 | A1* | 5/2015 | Okino .................. A63F 13/35 463/42 |
| 2015/0126288 | A1 | 5/2015 | Okino |
| 2015/0127692 | A1 | 5/2015 | Okino |
| 2015/0134621 | A1 | 5/2015 | Ki |
| 2015/0235028 | A1* | 8/2015 | Tsuchitoi ............. G06F 21/572 713/187 |
| 2015/0301823 | A1 | 10/2015 | Hatakeyama |
| 2016/0063018 | A1 | 3/2016 | Das |
| 2016/0179502 | A1* | 6/2016 | Cawley .................. G06F 8/54 717/121 |
| 2017/0199817 | A1 | 7/2017 | Ishihara |
| 2017/0235499 | A1 | 8/2017 | Xu |
| 2018/0011649 | A1 | 1/2018 | Hashimoto |
| 2018/0081894 | A1 | 3/2018 | Wang |
| 2019/0286833 | A1 | 9/2019 | Takumi |
| 2020/0319816 | A1 | 10/2020 | Li |
| 2021/0019164 | A1 | 1/2021 | Choudhary |

FOREIGN PATENT DOCUMENTS

| | | | |
|---|---|---|---|
| JP | 2000215201 | A | 8/2000 |
| JP | 2008501180 | A | 1/2008 |
| JP | 2008123104 | A | 5/2008 |
| JP | 2010515163 | A | 5/2010 |
| JP | 2015088144 | A | 5/2015 |
| JP | 2015095262 | A | 5/2015 |
| JP | 2015207145 | A | 11/2015 |
| JP | 2017123110 | A | 7/2017 |
| JP | 2019091477 | A | 6/2019 |
| JP | 2019114076 | A | 7/2019 |
| JP | 2019159830 | A | 9/2019 |
| JP | 2019164705 | A | 9/2019 |
| KR | 20170075009 | A | 6/2017 |
| WO | 2008083001 | A1 | 7/2008 |
| WO | 2014111984 | A1 | 10/2013 |
| WO | 2015039028 | A1 | 3/2015 |
| WO | 2021036848 | A1 | 3/2021 |

OTHER PUBLICATIONS

Vaniea, Kami, et al., "Tales of Software Updates: The process of updating software", Software and Programming Tools: CHI4good CHI 2016, pp. 3215-3226, May 7-16, 2016.

Microsoft Computer Dictionary, 5th Edition, Microsoft Press, Redmond, WA, p. 211, May 1, 2002.

Decision to Grant a Patent for related JP Application No. 2019-226720, 6 pages, dated Jun. 27, 2023.

International Search Report for corresponding PCT Application No. PCT/JP2020/036717, 4 pages, dated Dec. 1, 2020.

Notice of Reasons for Refusal for corresponding JP Application No. 2019-226718, 6 pages, dated Mar. 30, 2023.

International Search Report for corresponding PCT Application No. PCT/JP2020/036718, 4 pages, dated Dec. 15, 2020.

International Search Report for corresponding PCT Application No. PCT/JP2020/036716, 4 pages, dated Nov. 2, 2020.

"SMPTE Standard: Media Package for Storage, Distribution and Playback of Multimedia File Sets and Internet Resources," The Society of Motion Picture and Television Engineers, SMPTE ST 2053:2011, 39 pages, Jul. 13, 2011.

* cited by examiner

FIG.5

| NUMBER (HASH ID) | HASH VALUE |
|---|---|
| 1 | 0x00000001F42649B8 |
| 2 | 0x000001DE08932214 |
| 3 | 0x000004ACDB4323F1 |
| ... | ... |
| 99999 | 0xFFFF3591B7541A4C |
| 100000 | 0xFFFFFE0D32788A02 |

| NUMBER (FLAG ID) | ACCESS ALLOWANCE/DENIAL FLAG |
|---|---|
| 1 | 0 |
| 2 | 0 |
| 3 | 1 |
| ... | ... |
| 99999 | 1 |
| 100000 | 1 |

212

US 11,983,177 B2

INFORMATION PROCESSING DEVICE AND FILE ACCESS METHOD

TECHNICAL FIELD

The present invention relates to a technique for accessing a file.

BACKGROUND ART

Game software includes a file group for executing a game such as a startup file and a game program, and a file group used by an operating system (OS) of a game device. As hardware specifications of a game device have been improved dramatically, the number of files included in the game software becomes large, and the data size tends to be increased.

PTL 1 discloses game software having a flat path table containing hash values of full paths of files in association with information for identifying recording locations of the files, and a collision file containing names of files for full paths hash values of which collide, in association with corresponding pieces of information for identifying recording locations of the files. An information processing device disclosed in PTL 1 includes a reception section that receives a readout request including a full path of a file from a game program, a deriving section that derives a hash value of the full path, and an acquisition section that refers to the flat path table and acquires information for identifying a recording location of the file from the derived hash value. In a case in which the derived hash value collides, the acquisition section refers to the collision file and acquires the information for identifying the recording location of the file, from the name of the file.

CITATION LIST

Patent Literature

[PTL 1] JP 2015-88144A

SUMMARY

Technical Problems

At a time of activation of a game program, metadata necessary for the game program to access a file of game software is loaded into a memory. Since the size of the memory is limited, the data size of the metadata to be loaded is preferably as small as possible. It is to be noted that not only the game software but also any other types of software have the similar circumstances.

Solution to Problems

An aspect of the present invention relates to an information processing device that accesses a file included in software. The software includes hash values of paths of a plurality of files, as metadata. The information processing device includes an attribute information setting section that loads attribute information of each of the plurality of files into a memory, a receiving section that receives a readout request including a file path from a program, a deriving section that derives a hash value of the file path included in the readout request, a file confirming section that confirms whether the derived hash value matches with one of the hash values of the files included in the software, and a determining section that refers to the information loaded into the memory by the attribute information setting section in a case in which matching of the hash values is confirmed, to thereby determine whether or not a process on the file which has been subjected to the readout request is executable.

Another aspect of the present invention is a method of accessing a file included in software, the method including a step of loading attribute information of each of a plurality of files into a memory, a step of receiving a readout request including a file path from a program, a step of deriving a hash value of the file path included in the readout request, a step of confirming whether the derived hash value matches with one of hash values of the files included in the software, and a step of referring to the attribute information loaded into the memory in a case in which matching of the hash values is confirmed, to thereby determine whether or not a process on the file which has been subjected to the readout request is executable.

It is noted that any combinations of the constituent components described above and the expressions of the present invention that are converted between a method, an apparatus, a system, a recording medium, a computer program, and the like are also effective as aspects of the present invention.

BRIEF DESCRIPTION OF DRAWINGS

FIG. 5 is a view illustrating an example of a hash value table.

FIG. 6 is a view illustrating an example of an access allowance/denial information table.

DESCRIPTION OF EMBODIMENT

Figure 1:
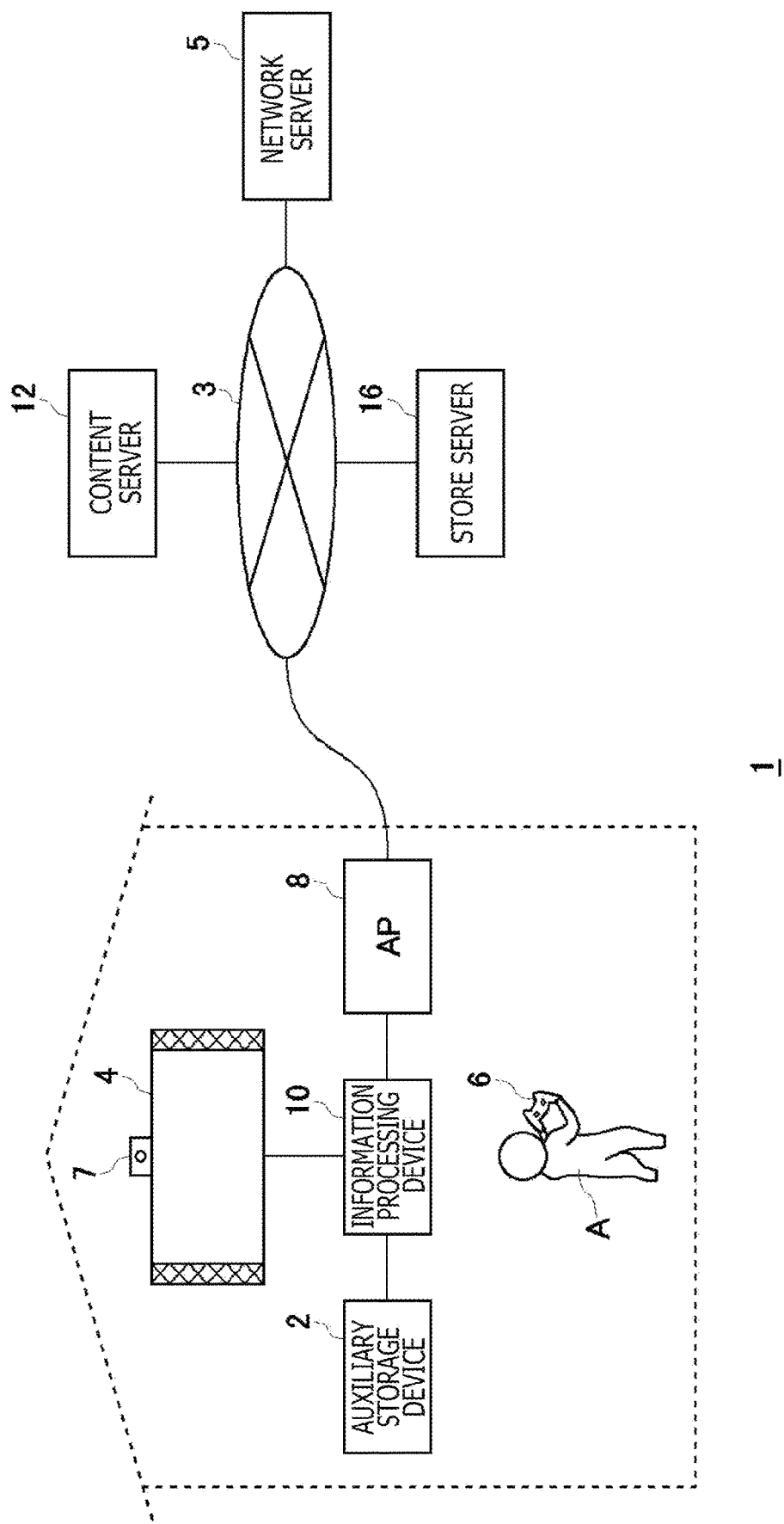
FIG. 1 is a diagram illustrating a configuration of an information processing system according to an embodiment of the present invention.

FIG. 1 illustrates an information processing system 1 according to an embodiment of the present invention. The information processing system 1 includes an information processing device 10, a network server 5, a content server 12 which distributes digital content, and a store server 16 which sells the digital content. An access point (hereinafter referred to as an "AP") 8 has functions of a wireless access point and a router. The information processing device 10 is connected, through the AP 8, to the network server 5, the content server 12, and the store server 16 on a network 3 in such a manner as to be able to communicate with the network server 5, the content server 12, and the store server 16. The network 3 may include the Internet, local area network (LAN), or the like.

The information processing device 10 is connected to an input device 6 operated by a user, in a wireless or a wired manner. The input device 6 outputs operation information indicating a result of operation by the user to the information processing device 10. When receiving the operation information from the input device 6, the information processing device 10 reflects the operation information in processing of an OS or an application, and causes an output device 4 to output a result of the processing. In the embodiment, the information processing device 10 is a game device that executes a game program by accessing files included in the game software. The input device 6 may be an apparatus, such as a game controller, which supplies the operation information of the user to the information processing device 10.

The network server 5 is maintained and managed by an operating entity that operates the information processing system 1. The network server 5 provides a network service to the user of the information processing system 1. The network server 5 manages a network account identifying the user. The user signs in to the network service provided by the network server 5, using the network account. By signing in to the network service, the user can purchase digital content from the store server 16, and receive the purchased digital content distributed from the content server 12. The digital content may be various types of application software. However, the following description will be made particularly of a case in which the digital content is game software.

An auxiliary storage device 2 is a large capacity storage device such as a hard disk drive (HDD) or a solid state drive (SSD). The auxiliary storage device 2 may be a built-in type storage device or may be an external storage device connected to the information processing device 10 by a universal serial bus (USB) or the like. The output device 4 may be a television set including a display which outputs an image and a speaker which outputs sound, or may be a head mounted display. A camera 7 captures an image of a space in which the user is present. The input device 6 may include a plurality of input sections such as a plurality of push type operating buttons, an analog stick allowing an analog quantity to be input, and a rotary button.

Figure 2:
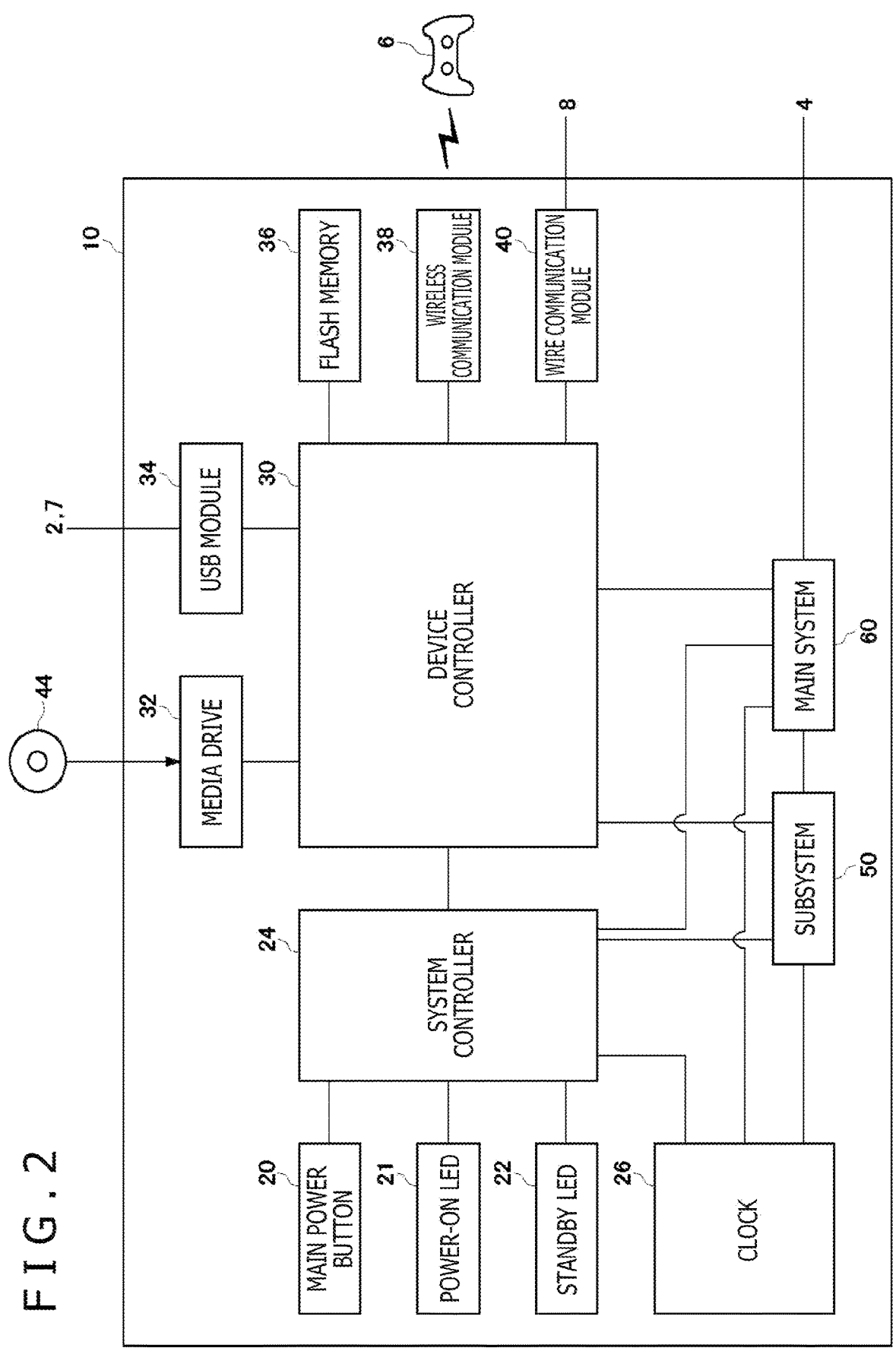
FIG. 2 is a diagram illustrating a hardware configuration of an information processing device.

FIG. 2 illustrates a hardware configuration of the information processing device 10. The information processing device 10 includes a main power supply button 20, a power-on light-emitting diode (LED) 21, a standby LED 22, a system controller 24, a clock 26, a device controller 30, a media drive 32, a USB module 34, a flash memory 36, a wireless communication module 38, a wire communication module 40, a subsystem 50, and a main system 60.

The main system 60 includes a main central processing unit (CPU), a memory as a main storage device, a memory controller, a graphics processing unit (GPU), and the like. The GPU is used mainly for arithmetic processing of a game program. These functions may be constructed as a system on a chip, and thus be formed on one chip. The main CPU has a function of activating the OS and executing the game program recorded in the auxiliary storage device 2 or on a read only memory (ROM) medium 44 under an environment provided by the OS.

The subsystem 50 includes a sub-CPU, a memory as a main storage device, a memory controller, and the like. The subsystem 50 does not include a GPU and does not have the function of executing the game program. The number of circuit gates of the sub-CPU is smaller than the number of circuit gates of the main CPU. The power consumption in operation of the sub-CPU is lower than the power consumption in operation of the main CPU.

The main power supply button 20 is a button by which operating input from the user is performed. The main power supply button 20 is provided to a front surface of a casing of the information processing device 10. The main power supply button 20 is operated to turn on or off the supply of power to the main system 60 of the information processing device 10. The power-on LED 21 is lighted when the main power supply button 20 is turned on. The standby LED 22 is lighted when the main power supply button 20 is turned off.

The system controller 24 detects depression of the main power supply button 20 by the user. When the main power supply button 20 is depressed while the main power supply is in an off state, the system controller 24 obtains the depressing operation as a "turn-on instruction." Conversely, when the main power supply button 20 is depressed while the main power supply is in an on state, the system controller 24 obtains the depressing operation as a "turn-off instruction."

The clock 26 is a real-time clock. The clock 26 generates the current date and time information, and supplies the generated date and time information to the system controller 24, the subsystem 50, and the main system 60.

The device controller 30 is configured as a large-scale integrated circuit (LSI) which executes delivery of information between devices like a south bridge. As illustrated in FIG. 2, such devices as the system controller 24, the media drive 32, the USB module 34, the flash memory 36, the wireless communication module 38, the wire communication module 40, the subsystem 50, and the main system 60 are connected to the device controller 30. The device controller 30 absorbs differences between electrical characteristics of the respective devices and differences between data transfer rates, and controls data transfer timing.

The media drive 32 is a drive device that is loaded with the ROM medium 44 on which such application software as a game and license information are recorded and that drives the ROM medium 44 to read a program, data, and the like from the ROM medium 44. The ROM medium 44 is a read-only recording medium such as an optical disc, a magneto-optical disc, or a Blu-ray disc.

The USB module 34 is a module connected to an external apparatus by a USB cable. The USB module 34 may be connected to the auxiliary storage device 2 and the camera 7 by a USB cable. The flash memory 36 is an auxiliary storage device forming an internal storage. The wireless communication module 38 performs wireless communication with the input device 6, for example, by using a communication protocol such as a Bluetooth (registered trademark) protocol or Institute of Electrical and Electronic Engineers (IEEE) 802.11 protocol. Incidentally, the wireless communication module 38 may support a digital mobile telephone system. The wire communication module 40 performs wire communication with an external apparatus and is connected to the network 3 via the AP 8.

Returning to FIG. 1, the content server 12 transmits game software that is purchased by the user from the store server 16, to the information processing device 10. The game software includes a startup file, such a file group as a game program necessary to proceed a game, and a file group to be used by the OS. The startup file is a program for activating the game program. When the startup file is executed, the game program is called up and executed. The file group to be used by the OS includes, for example, a game icon image or the like to be displayed on a game selection screen.

The game software has a tree type directory structure. A root directory includes the startup file. Subdirectories at a lower level are classified by file type. For example, a subdirectory for a three-dimensional (3D) model, a subdirectory for texture, a subdirectory for a script, and the like are formed.

Figure 3:
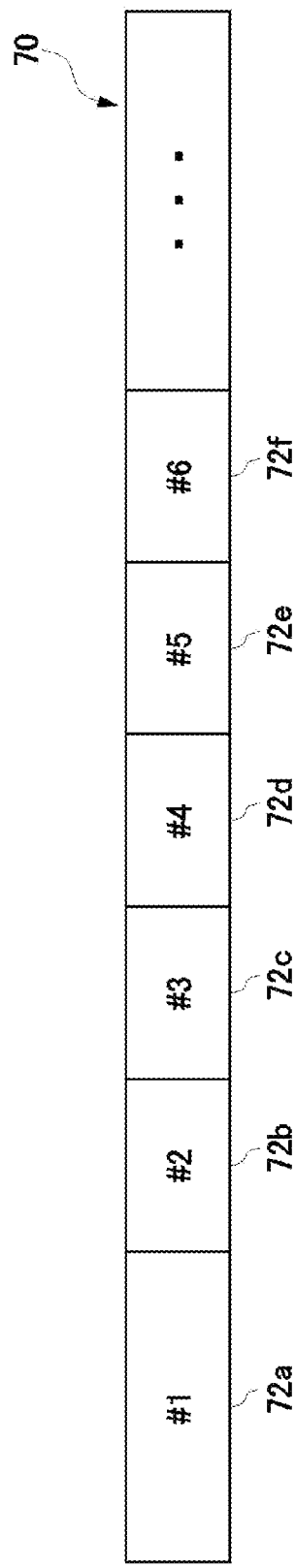
FIG. 3 is a conceptual diagram illustrating a file configuration of game software.

FIG. 3 illustrates a file configuration of game software. A main body of game software 70 according to the present embodiment includes a plurality of files and is logically divided into a plurality of groups 72, as illustrated in the figure. Each file belongs to at least one of the plurality of groups 72, and at least one file belongs to each group 72. The game software 70 illustrated in FIG. 3 includes a first group 72a as a front group, and a second group 72b, a third group 72c, a fourth group 72d, a fifth group 72e, and a sixth group 72f as groups following the first group 72a. Incidentally, there may be a seventh and subsequent groups 72 following the sixth group 72f. Each group is identified by such a group number as the first or the second.

The files included in the plurality of subdirectories belong to the respective groups that are divided logically. That is, each group includes files of different types, and is set such that files necessary for the information processing device 10 to execute a particular unit such as a scene or a stage in the game belong to each group.

A program file and a data file necessary to activate the game software 70 belong to the first group 72a. In a case in which the information processing device 10 obtains the game software 70 from the content server 12, if the information processing device 10 downloads all of the files belonging to the first group 72a, the information processing device 10 can immediately activate the game software 70 even if the information processing device 10 does not download the files of the following second group 72b and the subsequent groups.

After the information processing device 10 has obtained all of the files belonging to the first group 72a and activated the game software 70, the information processing device 10 downloads the files belonging to the following groups 72 in the background. The download waiting time of the user can be shortened by thus making a minimum of files necessary to execute the game downloaded first and allowing the game to be executed at a point in time that these files are obtained.

The first group 72a includes at least a metadata file, a game parameter file, a group file, a startup file, and an essential file. Although described below, the metadata file is a file relating to metadata necessary for file access and includes a hash value table, a seed parameter, and a correspondence table.

The game parameter file includes, for example, such information as a title identification (ID) and a display resolution, icon image data, and the like. The group file is a definition file describing in which group each file is included. The startup file is a program for activating the game program. Also, the essential file includes a file such as a program essential for the execution of the game, a common file to be used in the whole of the game, and the like.

When the information processing device 10 obtains all of the file groups belonging to the first group 72a, the information processing device 10 can activate the game, so that the user can play part of the game. It is to be noted that the game play in this case may also include a setting action performed at a time of a start of the game, for example, such setting action as determination of a character or determination of a game level by the user. That is, the first group 72a includes file groups necessary to activate the game and allow the user to perform at least some operation. The game play that can be performed by use of the file groups included in the first group 72a may be, for example, only an initial setting for the game or such a setting that the user can play up to the first stage of the game. This depends on the game manufacturer.

Many of recent games are created so as to be executable in a plurality of countries of different languages. Audio data and image data are created so as to correspond to a plurality of languages, and audio files and image files for the plurality of languages are included in one piece of packaged software. Such files may hereinafter be referred to as "language-dependent" files. The audio files and the image files basically tend to have a large data size. The data size of such language-dependent files accounts for a considerable proportion of the data size of the whole of the game software. Accordingly, the game software 70 according to the present embodiment includes groups of resource files for languages in which audio files and image files are collected on a language-by-language basis, in order that the user can obtain only necessary language-dependent files.

In addition, the game includes various play modes. For example, there may be present a single play mode in which one user plays or a multiplay mode in which a plurality of users play. The game software 70 includes dedicated files for respective play modes. The information processing system 1 in the present embodiment allows the user to download a file for a play mode in which the user desires to play and does not allow the user to download a file for a play mode in which the user does not desire to play. Hence, it is possible to avoid a situation in which a file for a play mode which is not used by the user is stored in the auxiliary storage device 2 of the information processing device 10.

In view of the circumstances described above, the information processing device 10 in the present embodiment does not download all files included in the purchased game software 70. For example, if the user selects download only the language-dependent file in Japanese, the information processing device 10 does not download other language-dependent files. In addition, if the user selects download of game files in a single play mode and does not select download of game files in a multiplay mode, the information processing device 10 does not download the game files in a multiplay mode. Accordingly, in the present embodiment, after the download processing is completed, there may occur a situation in which a file that has not been selected is not recorded in the auxiliary storage device 2.

Each file of the game software 70 has a full path starting from a root directory. For example, the file path is represented as (/directory A/directory B/directory C/directory D/directory E/file name). In a case in which the game software 70 includes one hundred thousand files or more, the layer number of directory becomes large, and the file path becomes long. In terms of system operation, the length of the file path has to be limited, and a maximum length of file path in the present embodiment is set to 1024 bytes, for example.

While the game is executed, the game program outputs a readout request including a file path to a file system, according to a progress of the game. At a time of activating the game program, if file paths of all the files are expanded (loaded) into a memory in advance, the file system searches for a file path specified by the game program, by character string matching among a set of the file paths having been loaded, so that the file system can confirm that the searched file path is an appropriate file path. However, when the number of files is large and each file path is long (1024 bytes at maximum), it takes time for character matching processing between one file path and another file path. Also, when all the file paths are expanded into the memory, a memory consumption becomes large, which is not preferable in terms of efficient use of the memory.

In view of this, the present embodiment does not use information on such a file path as (/directory A/directory B/directory C/directory D/directory E/file name), as metadata for search and uses the hash values of the file paths as the metadata for search. The data length of each hash value is 8 bytes, for example, and as compared to the data length of the file path, the memory consumption can be reduced to a great extent. A hash value table holding hash values for a plurality of file paths is included in the first group of the game software 70 and may be downloaded to the information processing device 10 first.

The hash value table numbers and records the hash values of the full paths of all the game files which may possibly be read out from the game program. In the hash value table, the hash values of the file paths are preferably arranged in ascending order or descending order for binary search. A system development kit (SDK) is delivered to a game manufacturer in order to create a package of game software, from the operating entity of the information processing system 1, and this SDK creates a hash value table by performing hashing processing of file paths upon creating package software.

After game software including a plurality of (for example, one hundred thousand or more of) game files is manufactured by a game manufacturer, the SDK uses optional seed parameters to create hash values of file paths for respective game files. At this time, the SDK generates hash values in such a manner that the hash values of respective file paths have sole values, that is, two or more hash values do not match with each other. The SDK may find a seed parameter with which hash values do not compete against each other, by trying a plurality of seed parameters.

At a time of packaging processing of software, the SDK obtains information relating to a group definition from the game manufacturer and performs a process of dividing the plurality of files into groups. At this time, the SDK causes the first group to include the created hash value table, the seed parameters used when the hash value table has been created, and a correspondence table in which the numbers of the hash value table (hash IDs) and the file paths are associated with each other. Accordingly, the hash value table, the seed parameters, and the correspondence table are provided first to the information processing device 10. Hereinafter, a description of the information processing device 10 will be given.

Figure 4:
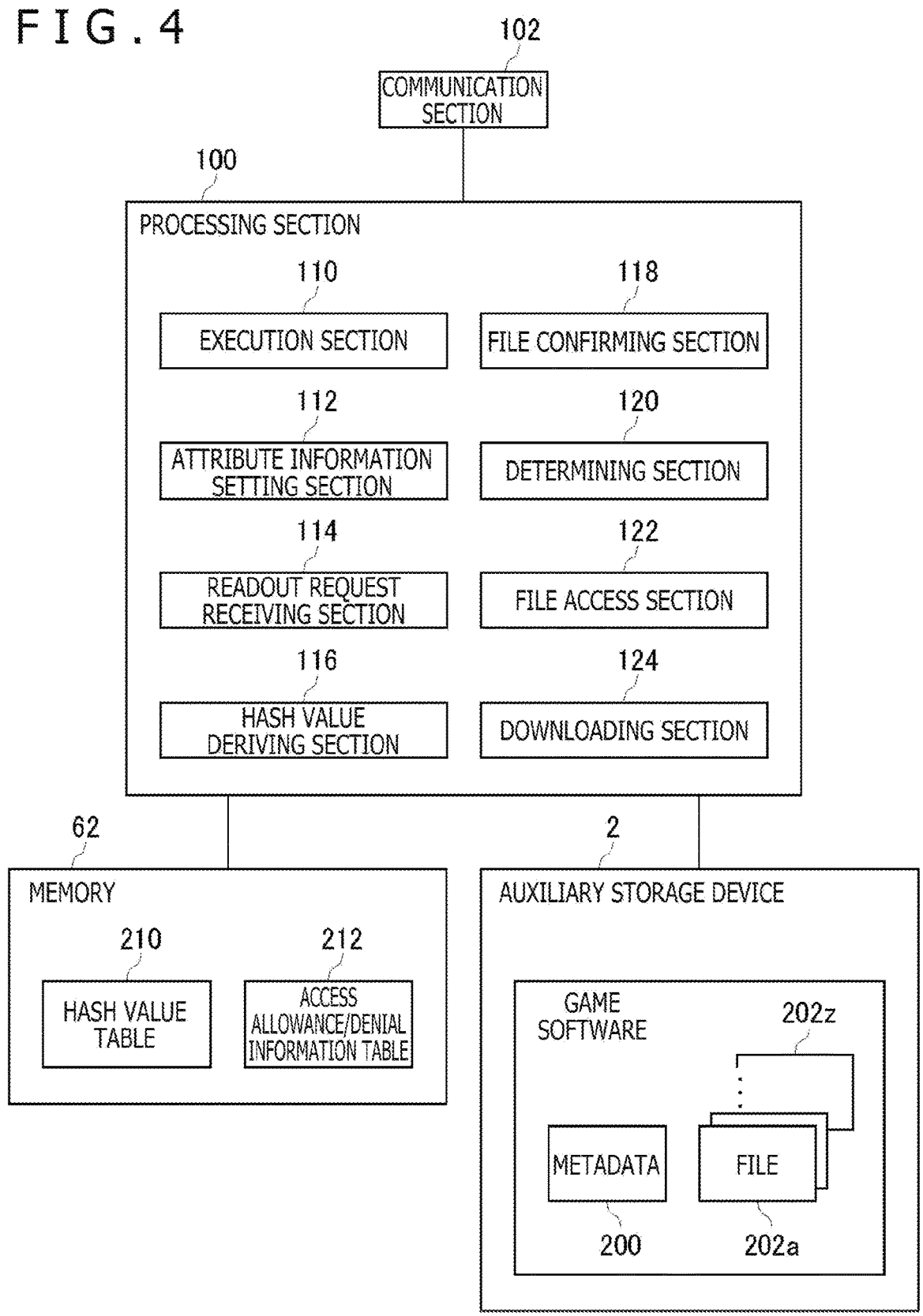
FIG. 4 is a diagram illustrating functional blocks of the information processing device.

FIG. 4 illustrates functional blocks of the information processing device 10. The information processing device 10 includes a processing section 100 and a communication section 102. The processing section 100 includes an execution section 110, an attribute information setting section 112, a readout request receiving section 114, a hash value deriving section 116, a file confirming section 118, a determining section 120, a file access section 122, and a downloading section 124. The communication section 102 is represented as such a configuration as to have functions of the wireless communication module 38 and the wire communication module 40.

A configuration of the processing section 100 is implemented by a CPU of any computer, a memory, a program loaded in the memory, a storage, and the like, as hardware components. However, the functional blocks implemented by a cooperation among these components are illustrated in this figure. Hence, it is to be understood by those skilled in the art that these functional blocks can be implemented in various forms by hardware only, by software only, or by a combination of hardware and software.

When the user purchases a game from the store server 16, the downloading section 124 downloads the purchased game software from the content server 12. At a time of downloading, the user can specify an unnecessary language-dependent file or a play mode in which the user does not desire to download. Accordingly, after the downloading processing is ended, the files that the user has not desired to download are not recorded in the auxiliary storage device 2.

The downloading section 124 executes download for each group. As illustrated in FIG. 3, the groups in the game software 70 are identified by the group numbers. The group number is set starting from 1, in ascending order, and the downloading section 124 transmits a download request to the content server 12 in units of group and records the game files transmitted from the content server 12 in the auxiliary storage device 2. For example, in a case in which the user selects download of the game files in a single play mode and does not select download of the game files in a multiplay mode, the downloading section 124 transmits the download request to the content server 12 in units of group, according to a downloading order that has been set for the single play mode. The downloading order of the groups may be provided to the downloading section 124 from the content server 12, prior to the start of the download.

FIG. 4 indicates a manner in which metadata 200 and a plurality of files 202*a* to 202*z* are recorded in the auxiliary storage device 2. It is to be noted that illustration of the definition file or other files is omitted. The metadata 200 includes the hash value table, the seed parameters, and the correspondence table in which the hash IDs and the file paths are associated with each other. The downloading section 124 manages whether or not to record each file included in the game software in the auxiliary storage device 2 and manages whether or not to record all the files belonging to each group in the auxiliary storage device 2.

Hereinafter, operation of the processing section 100 when the user plays the game will be described.

The information processing device 10 displays a game selection screen on which icons of a plurality of games are arranged on the output device 4. When the user selects an icon of a game to be played from now on, the execution section 110 activates a program of the game thus selected. At this time, the file confirming section 118 reads out the hash value table 210 from the metadata 200 held in the auxiliary storage device 2 and expands (loads) the hash value table 210 into the memory 62.

FIG. 5 indicates an example of the hash value table 210. In this example, the number of files which may possibly be read out from the game program is one hundred thousand, and accordingly, the hash values of one hundred thousand of file paths are held in the hash value table 210. The hash values of the file paths are numbered. In the example illustrated in FIG. 5, the hash values of one hundred thousand of file paths are arranged in ascending order to be numbered, and specifically, the hash values are arranged in association with numbers 1 to 100000 (hash IDs) in an order starting the smallest hash value. It is to be noted that one hundred thousand of hash values may be arranged in descending order in the hash value table 210.

Also, at a time of activation of a game, the attribute information setting section 112 loads attribute information of each of a plurality of files (one hundred thousand of files, here) that may possibly be read out from the game program, into the memory 62. The attribute information includes information indicating whether or not access to the file is allowed. When the information indicating whether or not access to the file is allowed is referred to as "access allowance/denial information," the access allowance/denial information may be represented as a flag value. The flag value 1 of the access allowance/denial information indicates that access to the file is allowed, while the flag value 0 indicates that access to the file is denied. Meaning that access to the file is denied includes not only a case in which the file is not recorded in the auxiliary storage device 2, but also a case in which, while the file is recorded, the other files included in the group to which the file belongs are not recorded and the group cannot be used.

At a time of activation of the game, the attribute information setting section 112 secures an area for loading one hundred thousand pieces of attribute information in the memory 62 and writes the access allowance/denial information of each file into an access allowance/denial information table 212. As described above, the downloading section 124 manages whether or not to record each file included in the game software in the auxiliary storage device 2 and manages whether or not to record all the files belonging to each group in the auxiliary storage device 2. The attribute information setting section 112 may obtain these pieces of management information from the downloading section 124 and generate access allowance/denial information of each file. As described above, in a case in which the file is recorded in the auxiliary storage device 2 and some other files included in the group to which the file belongs are not recorded in the auxiliary storage device 2, the attribute information setting section 112 sets the flag value of the file to 0.

FIG. 6 illustrates an example of the access allowance/denial information table 212. The numbers (flag IDs) in the left field correspond to the numbers (hash IDs) from 1 to 100000 in the hash value table. That is, the hash ID and the flag ID of the same value represent the same file. In the right field of the access allowance/denial information table 212, the access allowance/denial information of each file is recorded as a flag value. As described above, the metadata 200 includes the correspondence table in which the hash IDs and the file paths are associated with each other, and by referring to the correspondence table, the attribute information setting section 112 writes the access allowance/denial information of the file, in association with the same flag ID as the hash ID. It is to be noted that the access allowance/denial information table 212 may include not only the flag values indicating access allowance/denial of the files but also the attribute information indicating whether or not to be capable of reading/writing.

As described above, prior to start of the game, the hash value table 210 and the access allowance/denial information table 212 are put into a state of being loaded into the memory 62. Comparing with a state in which all the file paths are loaded into the memory 62 as the metadata, the memory consumption of the hash value table 210 and the access allowance/denial information table 212 is small to a great extent, and efficient use of the memory 62 can be realized.

While the user is playing the game, the game program outputs a readout request including the file path to the file system. In the file system, the readout request receiving section 114 receives the readout request including the file path and transfers the file path to the hash value deriving section 116. The hash value deriving section 116 derives the hash value of the file path, using the seed parameter included in the metadata 200.

The file confirming section 118 refers to the hash value table 210 and confirms whether or not the derived hash value matches with the hash value of the file included in the game software. One hundred thousand hash values exist in the hash value table 210 and are arranged in ascending order or descending order, and accordingly, the file confirming section 118 can confirm the matching of the hash values efficiently, using the binary search algorithm. In a case in which the derived hash value is not included in the set of one hundred thousand of hash values, the determining section 120 determines that a certain error has occurred and rejects the readout request.

In a case in which matching of the hash values is confirmed, the determining section 120 refers to the attribute information loaded into the memory 62 by the attribute information setting section 112 and determines whether or not a process on the file can be executed. Specifically, the determining section 120 refers to the access allowance/denial information loaded into the memory 62 and determines whether or not access to the file is allowed. In a case in which the determining section 120 determines that access to the file is allowed, the file access section 122 accesses the file. Conversely, in a case in which determining section 120 determines that access to the file is denied, the file access section 122 does not access the file.

As described above, the processing section 100 can search for a particular file from the set of files and determine accessibility of the file, by use of the hash value table 210 and the access allowance/denial information table 212 with a small memory consumption.

The present invention has been described above on the basis of the embodiment thereof. The foregoing embodiment is illustrative, and it is to be understood by those skilled in the art that combinations of constituent elements and processing processes of the embodiments are susceptible of various modifications and that such modifications also fall within the scope of the present invention. In the foregoing embodiment, a game is provided as an example of software. However, the present invention may be applied to other software applications.

INDUSTRIAL APPLICABILITY

The present invention can be applied to the technical field for accessing a file.

REFERENCE SIGNS LIST

1: Information processing system
10: Information processing device
62: Memory
70: Game software
100: Processing section
102: Communication section
110: Execution section
112: Attribute information setting section
114: Readout request receiving section
116: Hash value deriving section
118: File confirming section
120: Determining section
122: File access section
124: Downloading section

The invention claimed is:

1. An information processing device that accesses a file included in software, the software including hash values of paths of a plurality of files, the information processing device comprising:
an attribute information setting circuit that loads attribute information of each of the plurality of files into a memory;
a receiving circuit that receives a readout request including a file path from a program;
a deriving circuit that derives a hash value of the file path included in the readout request;
a file confirming circuit that confirms whether the derived hash value matches with one of the hash values of the files included in the software; and
a determining circuit that refers to the information loaded into the memory by the attribute information setting circuit in a case in which matching of the hash values is confirmed, to thereby determine whether or not a process on the file which has been subjected to the readout request is executable.

2. The information processing device according to claim 1, wherein the attribute information includes information indicating whether or not access to a file is allowed.

3. The information processing device according to claim 1, wherein
hash values of a plurality of file paths are numbered, and
the attribute information setting circuit associates the numbers of the hash values with respective pieces of the attribute information.

4. The information processing device according to claim 2, wherein the hash values of the plurality of file paths are arranged and numbered in ascending order or descending order.

5. The information processing device according to claim 1, wherein the determining circuit determines whether or not access to the file which has been subjected to the readout request is allowed.

6. The information processing device according to claim 3, wherein the hash values of the plurality of file paths are generated so as not to match with one another.

7. A method of accessing a file included in software, comprising:
loading attribute information of each of a plurality of files into a memory;
receiving a readout request including a file path from a program;
deriving a hash value of the file path included in the readout request;
confirming whether the derived hash value matches with one of hash values of the files included in the software; and
referring to the attribute information loaded into the memory in a case in which matching of the hash values is confirmed, to thereby determine whether or not a process on the file which has been subjected to the readout request is executable.

8. A non-transitory, computer readable storage medium containing a computer program, which when executed by a computer that accesses a file included in software, causes the computer to perform a method by carrying out actions, comprising:
loading attribute information of each of a plurality of files into a memory;
receiving a readout request including a file path from a program;
deriving a hash value of the file path included in the readout request;
confirming whether the derived hash value matches with one of hash values of the files included in the software; and
referring to the attribute information loaded into the memory in a case in which matching of the hash values is confirmed, to thereby determine whether or not a process on the file which has been subjected to the readout request is executable.

* * * * *